United States Patent [19]
Barraud et al.

[11] Patent Number: 5,086,457
[45] Date of Patent: Feb. 4, 1992

[54] PREPAYMENT DATA TRANSMISSION SYSTEM

[75] Inventors: Claude Barraud, Brussels, Belgium; Jean-Loup Poilleux, Vanves; Christian Guion, Verrieres-le-Buisson, both of France

[73] Assignee: Schlumberger Industries, Montrouge, France

[21] Appl. No.: 649,680

[22] Filed: Jan. 15, 1991

Related U.S. Application Data

[63] Continuation of Ser. No. 553,733, Jul. 13, 1990, which is a continuation of Ser. No. 327,474, Mar. 22, 1989, abandoned.

[30] Foreign Application Priority Data

Mar. 28, 1988 [FR] France ................................. 88 04015

[51] Int. Cl.⁵ ..................... H04M 15/10; H04M 17/02
[52] U.S. Cl. ..................................... 379/144; 379/154; 379/112; 379/123
[58] Field of Search ............... 379/144, 154, 155, 112, 379/123, 132

[56] References Cited

U.S. PATENT DOCUMENTS 4,845,740  7/1989  Tokuyama et al. ................. 379/144
4,879,744  11/1989  Tasaki et al. ......................... 379/144
5,003,585  3/1991  Richer ................................. 379/144

Primary Examiner—Stafford D. Schreyer
Attorney, Agent, or Firm—Frishauf, Holtz, Goodman & Woodward

[57] ABSTRACT

The invention relates to a prepayment indoor telephone in which payment is performed by means of memory cards. In order to make the use of the telephone set (104) secure, a verification module (110) is connected to its telephone line (130) in the vicinity of the exchange (102). The verification module (110) and the telephone (104) periodically generate two respective versions of authentication information and these two versions are compared in the verification module (110). Authentication takes place only if the card reader (128) has delivered a signal indicating that the required telephone charge has been paid.

9 Claims, 3 Drawing Sheets

PREPAYMENT DATA TRANSMISSION SYSTEM

This application is a continuation of application Ser. No. 07/07/553,733 filed July 13, 1990, which is a continuation application of Ser. No. 07/327,474 filed Mar. 22, 1989, now abandoned.

The present invention relates to a prepayment data transmission system, in particular a system implementing prepayment by means of a memory card.

BACKGROUND OF THE INVENTION

More precisely, but not exclusively, the invention relates to such a system as applied to a prepayment indoor telephone set where payment is performed by means of cards, i.e. it relates to a telephone set installed on private premises, or even in a public place, where telephone charges are paid at least mainly by means of memory cards and without there being any call billing, or even without there being any customer to bill. The invention is particularly advantageous when telephone charging is performed by counting charging pulses transmitted from the telephone exchange, with user prepayment then taking place immediately. It will be understood that under such circumstances it must be impossible for the prepayment telephone set to be replaced by a normal telephone set since that would enable telephone calls to be obtained free of charge by a fraudulent user.

More generally, the invention applies to any case where mutual authentication needs to be established between a terminal (in particular a telephone) and a transmission line (in material form or otherwise) prior to authorizing data interchange.

One solution that has already been proposed for solving this problem is as follows: during the initial stage in which a telephone call is set up, coded magnitudes are interchanged between the transmitter and the receiver for the purpose of verifying that the call is authorized. Such a system solves the problem in part, only. Proposals have also been made to encode the information to be transmitted at the transmitting end to decode it symmetrically at the receiving end. However when information is transmitted in the form of analog frequency signals coding and decoding operations become relatively complex.

In order to remedy this drawback, an object of the invention is to provide such a telephone call system which enables call authorization to be verified throughout the duration of a call and which is also compatible with the transmission of information in the form of analog frequency signals, and which finally is capable of countering attempts at fraud, including recording the signals interchanged while setting up earlier calls.

SUMMARY OF THE INVENTION

The present invention provides a prepayment information transmission system which includes a terminal connected to a line for transmitting such prepayment information. Charging signals are emitted for determining instants at which payment is required. A receipt signal is generated whose state depends on whether or not payment has been performed in response to a charging signal. A verification module is connected to the transmission line and associated with the terminal. Synchronizing signals are applied to the terminal and the module. Each of the module and the terminal implement a common algorithm ALG upon the occurrence of each synchronizing signal in order to generate respective authentication information $K_i$ and $K'_i$ depending, in each case, at least on the preceding authentication information $K_{i-1}$. The terminal provides the authentication information to the module, and the module provides initial authentication information $K_O$ to the terminal, and compares authentication information $K_i$ generated by the module with authentication information $K'_i$ received from the terminal. The system inhibits information transmission in response to such comparison and in response to the state of the received signals. Preferably, the terminal generates the authentication value $K'_i$ only if the received signal is in its state corresponding to the fact that payment has been performed. Preferably, the charging signals also constitute the synchronizing signals.

BRIEF DESCRIPTION OF THE DRAWINGS

An embodiment of the invention is described by way of example with reference to the accompanying drawings, in which.

DETAILED DESCRIPTION

Figure 1:
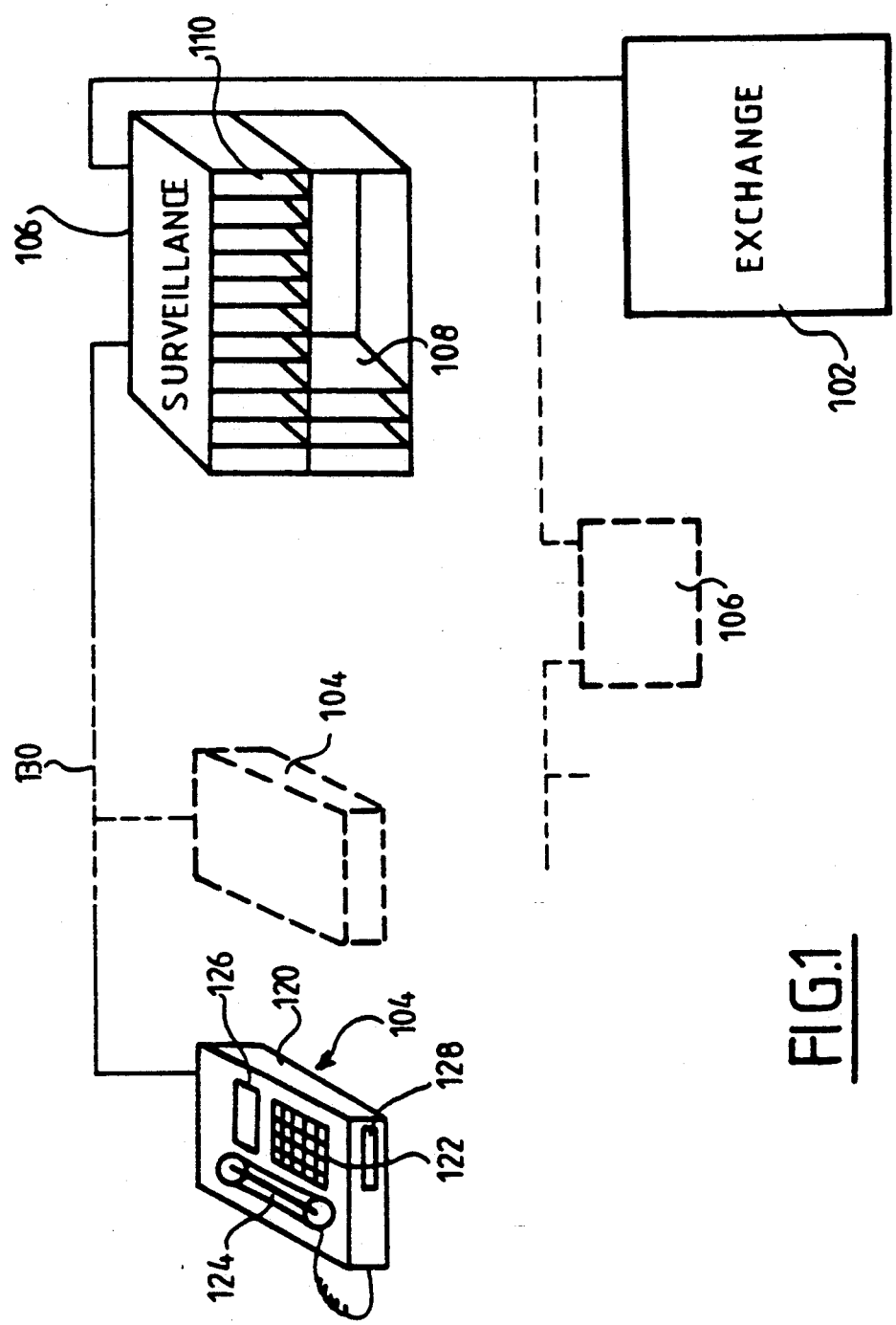
FIG. 1 is a simplified overall view of a telephone system in accordance with the invention.

An information transmission system in accordance with the invention is initially described as a whole with reference to FIG. 1 and in the particular case of a fixed prepayment telephone set operated by means of memory cards.

The system comprises a telephone exchange 102, telephone sets, represented in FIG. 1 by a single telephone set 104, and a surveillance unit 106 connected between the exchange 102 and the telephone sets 104. More precisely, the exchange 102 may be associated with a plurality of surveillance units such as 106, with each surveillance unit 106 being connected to a plurality of telephones 104.

The surveillance unit 106 contains as many verification circuits or modules 108 as there are telephones associated with the unit 106, with each module being associated with a corresponding telephone. An independent power supply 110 for the surveillance unit 106 is also shown. The surveillance unit 106 is disposed in a location which is not accessible to the users of telephone terminals.

In conventional manner, each telephone set 104 comprises a housing 120 provided with a telephone handset 124, and on its top face with a keypad 122 for dialing telephone numbers and preferably also with a display 126, e.g. a liquid crystal display. The telephone set 104 also includes a memory card read/write device 128 whose insertion slot can be seen in the front face of the housing 120. Naturally the keypad 122 could be mounted on the handset 124.

Before describing the details of the structure and function of a system in accordance with the invention, the theory on which it is based is described below.

Each verification module 108 serves to verify that the telephone set with which it is associated is indeed authorized to operate from the location at which it is connected. In other words, each module 108 is used to authenticate the corresponding telephone 104. In addition to providing its normal telephone functions, each telephone 104 serves to ensure, prior to establishing or continuing a telephone call, that the appropriate telephone charging amount has been taken from the user's card.

Authentification is performed as follows: each time exchange 102 delivers a charging pulse, the verification module 108 calculates an authentication value $K_i$ by implementing an algorithm ALG which depends at least on the value of the preceding authentication value $K'_{i-1}$. The value $K'_{i-1}$ is transmitted over the telephone line to the verification module 108. The values $K_i$ and $K'_i$ are compared. Unless they correspond or are identical, the telephone line is inhibited.

The telephone set 104 verifies that the telephone charge unit has been paid, as follows: on receiving a charging pulse, the card reader ensures that the balance available in the card memory is not less than the amount of the telephone charge to be paid, and it decrements the balance in the card by an amount corresponding to the required charge. When this operation has been performed, the telephone set calculates the authentication value $K'_i$. Consequently, if the charge is not taken from the card, then the value $K'_i$ is not sent. This prevents the verification module 108 from performing a comparison and the telephone line is therefore inhibited.

The main circuits in the verification module 108 are now described with reference to FIG. 2. The module 108 is connected to the line 130. It receives charging signals TT from the exchange 102 and it receives an off-hook signal DT from the caller. It also receives signals from the telephone set representative of the authentication values $K'_i$.

The verification module 108 includes a first bandpass filter 140 which is centered on the frequency of the charging signal TT, e.g. 12 kHz. On receiving a telephone charging signal TT, a decoding and shaping circuit 142 delivers a characteristic signal A which is applied to an input 144 of a microprocessor 146 controlling the verification module. The module 108 also includes a circuit 148 for detecting when the caller "goes off-hook". Such circuits are well known. They operate, for example, by detecting changes in line current between the on-hook and the off-hook states of the telephone set. The circuit 148 generates a specific signal B whenever the caller is detected as being "off-hook" and this signal is applied to an input 150 of the microprocessor 146. The module 108 includes a second filter 152 which is centered on the frequency used for sending the authentication signals $K_i$ and $K'_i$. The way these signals are generated is described below.

The filter 152 is associated with a decoding circuit 154 which delivers the authentication value $K_i$. The value $K_i$ is applied to an input 156 of the microprocessor 146.

The module 108 also includes a frequency generator 158 controlled by a coding circuit 160 which is in turn controlled by a digital value appearing at an output 162 of the microprocessor 146. As explained below, the generator 158 serves to generate a signal representative of the initial authentication value $K_O$. The microprocessor 146 is associated with a working memory 164 of the RAM type, and with a program memory 166 of the EPROM type. In addition to containing the overall control program for the module 108, the program memory 166 contains special programs ALEAT, ALG and COMP.

The program ALEAT serves to generate a random value $K_O$ which is the initial authentication value. The program ALG is an algorithm for generating the authentication value $K_i$ on the basis of an authentication value $K_{i-1}$ and other parameters. The program ALG serves, for example, to implement a D.E.S. type encoding algorithm. Finally, the program COMP causes the microprocessor 146 to compare two digital values, typically authentication values $K_i$ and $K'_i$. The program COMP also contains the equivalent of a time constant $T_1$. It generates an inhibit signal if the verification module does not receive an authentication signal $K'_i$ within a period $T_1$ from receipt of the charging signal. The module 108 also includes an inhibit circuit 168 for inhibiting the line 130 whenever a control signal C appears on output 170 of the microprocessor 146.

The telephone set 104 is described with reference to FIG. 3. The signals which appear at the input 180 of the telephone 104 are applied to three filters 182, 184, and 186. The filter 182 is identical to the filter 140 in FIG. 2. It serves to detect that a charging signal TT has been received. When such a signal appears, the shaping circuit 188 delivers a signal A' which is applied to the input 190 of a microprocessor 192. The filter 184 is a filter whose passband corresponds to the telephone voice frequency range of 300 Hz to 3400 Hz. The output of the filter 184 is connected to the "telephone" circuit 194 of the telephone set.

Figure 2:
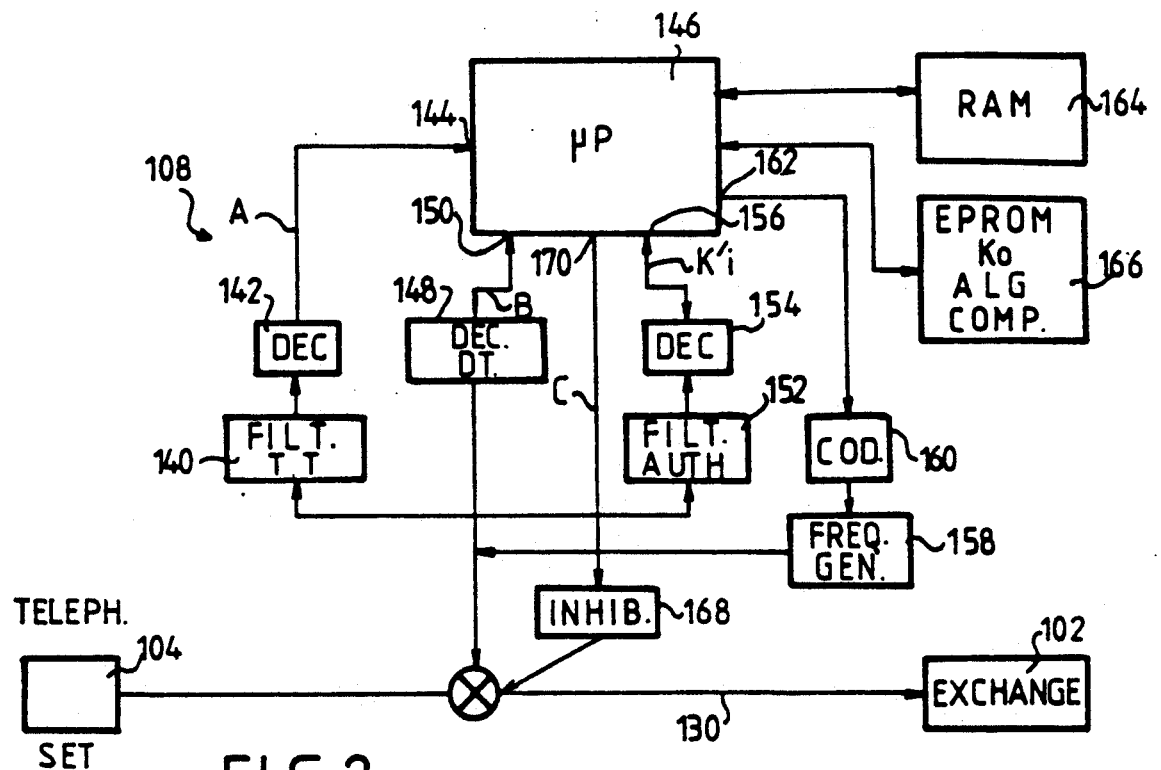
FIG. 2 shows the circuits of a verification module.

The filter 186 is identical to the filter 152 in FIG. 2. It is centered on the frequency range corresponding to the authentication signals $K_i$. The output from the filter 186 is applied to a frequency-to-digital converter 196 which delivers the value of the received authentication signal. As explained below, this is the initial authentication value $K_O$. The value $K_O$ is applied to an input 198 of the microprocessor 192.

The telephone set also includes a frequency generator 200 associated with a control circuit 202 which itself receives digital authentication values $K'_i$ which appears at output 204 of the microprocessor 192. The microprocessor 192 is associated with a working memory 206 of the RAM type and with a program memory 208, e.g. of the EPROM type.

As already mentioned briefly, the telephone 104 includes a memory card read/write device 28. In the example described, the device is suitable for use with cards having electronic memories. Each card 210 includes an integrated circuit which is essentially constituted by a memory. The memory may be of the PROM or of the EPROM type. A protected zone of the memory contains fixed information IF for identifying the type of card. The remainder of the memory is used for writing the balances which are successively made available. When using a PROM type memory, it contains a certain number of memory locations which are initially blank (zero state). Each memory location corresponds to a single charge unit. The balance is changed by causing a number of memory locations corresponding to the total telephone charge to change irreversibly from state 0 to state 1. The state 0 to state 1 changeover is obtained by applying a write voltage to the corresponding memory location.

The read/write device includes guide means 212 into which the user inserts the card 210 and which serve to convey said card to a processing position in which external electrical contact tabs on the card are connected to connection elements in the read/write head of the reader 128. An input/output (I/O) circuit 216 is used to control the reading of information recorded in the card memory and the writing of new information into that memory. The I/O circuit 216 is controlled by the microprocessor 192.

Figure 3:
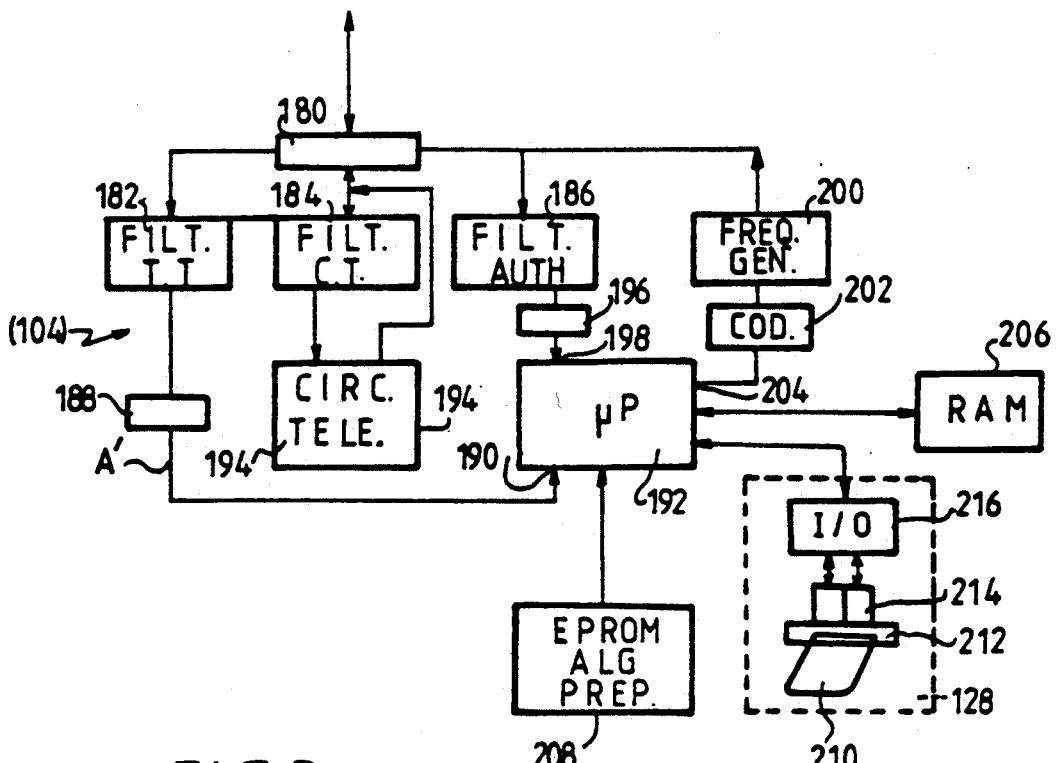
FIG. 3 shows the circuits of a telephone set.

Before describing the operation of the telephone call system shown in FIGS. 1 to 3 in greater detail, two manners of generating frequency signals representative of authentication values $K_i$ and $K'_i$ are described.

Figure 4:
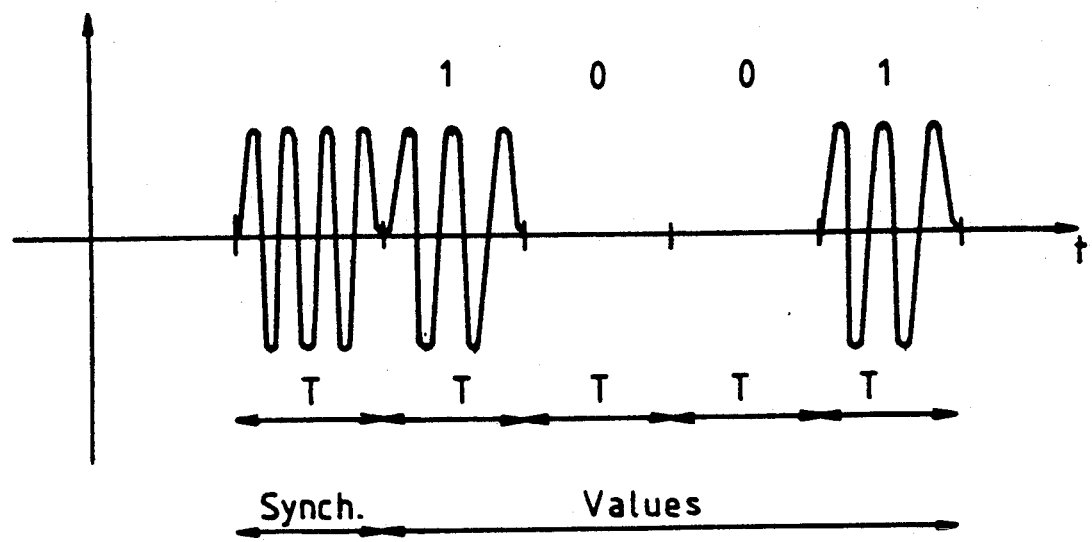
FIG. 4 is a waveform diagram showing a first manner of generating authentication signals.

FIG. 4 shows a first manner of generating an authentication value signal. It comprises five periods of equal duration T. The first period is a synchronizing period and its value is always 1. The other four periods T are meaningful periods each corresponding to the value 1 or to the value 0. The authentication value $K_i$ is therefore expressed by means of four binary digits (bits). The value 1 corresponds to the presence of a signal at constant amplitude and frequency. The value 0 corresponds to the absence of this signal. The frequency signal preferably has a frequency of about 18 kHz. As a result, this frequency can easily be distinguished from the frequency of the charging signal which is about 12 kHz, and from the frequency of the voiceband signal which is less than 3.5 kHz.

Figure 5:
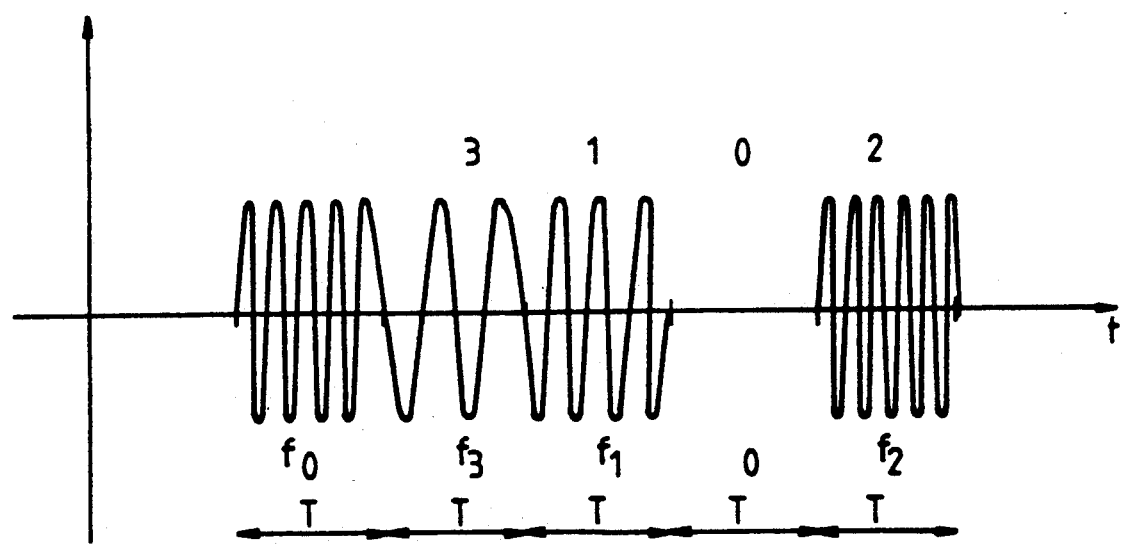
FIG. 5 is a waveform diagram showing a second manner of generating authentication signals.

In the manner of generating a signal shown in FIG. 5, the signal corresponding to an authentication value is likewise divided into five periods of equal duration T. The first period is a synchronizing period and the next four periods convey meaning. During the synchronizing period, a signal of frequency $f_1$ is always present. During each of the other periods, there may be no signal (value 0) or there may be a signal of frequency $f_1$, $f_2$, or $f_3$ (corresponding to values 1, 2, or 3). Each period of the authentication signal can thus take on four different values in the range 0 to 3. Since each signal contains four meaningful periods, the authentication value may have $4^4$ different values. By way of example, $f_2$ may be equal to 18 kHz, $f_1$ to 16.5 kHz, and $f_3$ to 19.5 kHz. It is thus easy to distinguish these three frequencies. The period T is equal to 20 milliseconds (ms), for example. More generally, authentication frequencies should like outside the voice frequency band and outside the frequency band used for charging signals.

Naturally, the number of periods could be other than 4. Similarly, the duration of each period in the signal need not be fixed, but could depend on the frequency of the signal being generated during said period.

Operation of the complete telephone system is described in greater detail with reference to FIGS. 2 and 3.

When the user picks up the handset 124 of the telephone set, the verification module 108 receives the off-hook signal DT. The decoder 148 then delivers the signal B which is applied to the microprocessor 146. This signal initializes the running of the program ALEAT stored in the memory 166. This program generates a random number which is the initial authentication value $K_0$. This value is stored in the RAM 164. Thereafter the value $K_O$ is converted into a corresponding authentication signal. The particular form of this signal depends on the manner selected for generating it. If using the manner shown in FIG. 4, then the coding circuit 160 which receives the value $K_O$ controls the frequency generator 158 so that it delivers a signal at frequency $f_O$ during the synchronization period of duration T, and then during the subsequent periods T it causes a signal to be generated at the frequency $f_O$ depending on the values of each of the four bits specifying $K_O$. The frequency generator 158 therefore delivers only the frequency $f_O$. If the manner shown in FIG. 5 is used, then the generator 158 is organized to be capable of delivering a selected one of the three frequencies $f_1$, $f_2$, or $f_3$, and also to be capable of delivering no frequency. The program ALEAT determines the appropriate frequency value (0, $f_1$, $f_2$, or $f_3$) to be sent during each of the four meaningful periods.

The telephone set receives the authentication signal corresponding to the value $K_O$. This signal is received by the filter 186 and is decoded by the circuit 196. The value $K_O$ is then stored temporarily in the RAM 206.

The user inserts a card 210 into the reader 28. The circuit 216 verifies that the card is indeed suitable for giving access to use of the telephone set by verifying the information IF, and it reads the balance remaining in the memory of the card. This balance value is displayed on the display 126. If the balance is zero or less than one telephone charge unit, then the telephone set is inhibited and the card is returned. In the remaining description it is assumed that sufficient balance remains in the card.

When the first telephone charging signal is received simultaneously by the verification module 108 and by the telephone set 104 the following two series of operations take place.

At the telephone set, when the filter 182 receives the charging signal, the decoder 188 generates a signal A' which is received by the microprocessor 192. This causes a program PREP to run. The program PREP controls the operation of the reader 128 to cause the reader to reduce the balance available in the memory of the card 210 by an amount corresponding to the charge to be paid. When this operation has been completed, the microprocessor 192 causes the program ALG to be run. As already mentioned, this program serves to generate a new authentication value on the basis of the preceding value by implementing a DES type encoding algorithm. The authentication value $K'_1$ generated in this way is stored in the RAM 206 instead of the old value $K_O$. The frequency generator 200 then generates the authentication signal which corresponds to the value $K'_1$.

Returning to the verification module 108, the procedure takes place as follows. When the filter 140 receives the charging signal TT, the decoder 142 applies the signal A to the microprocessor 146. This causes the program ALG to be run. The program ALG generates a new authentication value $K_1$ from the old value $K_O$ and the new value is stored in the RAM 164 instead of the old value $K_O$. Thereafter, the module 108 stands by to receive an authentication signal from a telephone set. If this signal is not received after a time $T_1$, then the circuit 168 causes the telephone line to be inhibited. The time $T_1$ may be equal to 450 ms, for example. When the authentication signal is received by the filter 152 within the appropriate time $T_1$, the decoder 154 provides the microprocessor 146 with the corresponding authentication value $K'_1$. Thereafter, the microprocessor 146 compares the received value $K'_1$ with the already generated value $K_1$ (using the program COMP). If the comparison is positive, then the line 130 is not inhibited and the user may speak.

During a telephone call, whenever a new charging signal is sent, the same operations take place again. The telephone set subtracts the new amount from the card and it calculates a new authentication value $K'_2$ which it transmits to the verification module 108. Simultaneously the module 108 calculates a new authentication value $K_2$ and compares it with the received value $K'_2$.

The process continues each time a new charging signal is received until the end of the telephone call or until the balance in the card is exhausted.

It follows from the above description that a telephone call system in accordance with the invention does indeed satisfy the required conditions of security.

The algorithm ALG includes parameters which are specific to a given telephone set and to its associated verification module. It is therefore very difficult to replace an authorized telephone set with any other set since that would require fraudulent knowledge of the entire coding program ALG. Indeed, even if the program itself can be copied and loaded into the memory of a "fraudulent" telephone set, it is still necessary to supply the program with the initial value $K_O$. This value is delivered by the verification module by implementing the program ALEAT for generating pseudo-random numbers.

Preferred embodiments of the invention are described above. Naturally, the invention is capable of numerous variants. In particular, an electronic memory card could be replaced by a magnetic memory card if a lower degree of security with respect to payment is acceptable. Similarly, in addition to payment by means of cards, the telephone set could be equipped with a coin mechanism with payment then being performed, on reception of each charging pulse, by inserting coins.

In another embodiment of the invention, the telephone set may be of the type having an internal charging table. Such sets are well known. They include charging circuits containing information about the duration of a telephone call unit and on its value as a function of the called number. These circuits generate charging pulses at the beginning of each time unit and they are also provide the monetary value of the unit. This information is applied to the card reader which makes the appropriate changes to the recorded balance in the card, whenever possible.

Two solutions are possible in accordance with the invention when using this type of telephone. The first solution consists in providing for the charging pulse generated by the charging circuit in the telephone set to be transmitted to the verification module, as well. Naturally, in this case the telephone exchange does not generate charging signals. The second solution consists in detecting the off-hook signal DT which initializes the authentication process. Both in the terminal and in the verification module, this signal initializes the transmission of synchronizing signal at fixed intervals. Each time a synchronizing signal appears, new authentication information is generated. At the telephone set, prior to sending the authentication signal, the microprocessor in the telephone set verifies that the money required for the current period of conversation has indeed been taken from the card. In a variant of this embodiment, the verification of authentication and the verification of payment of telephone charges can be performed separately. If authentication fails then the verification module inhibits the telephone call, whereas if payment fails, then the telephone inhibits the call.

Finally, the invention is naturally applicable to prepayment types of information transmission other than telephone calls. It could be applied, for example, to computer networks.

We claim:

1. A prepayment information transmission system comprising:
    a terminal connected to a line for transmitting said information;
    means for emitting charging signals determining instants at which payment is required;
    payment verification means for emitting a receipt signal whose state depends on whether or not payment has been performed in response to a charging signal;
    a verification module connected to said transmission line and associated with said terminal; and
    means for applying synchronizing signals to said terminal and said module;
    each of said module and said terminal including means for implementing a common algorithm ALG on the appearance of each synchronizing signal in order to generate respective authentication information $K_i$ and $K'_i$ depending, in each case, at least on the preceding authentication information $K_{i-1}$;
    said terminal further including means for emitting said authentication information to said module and said module including means for emitting initial authentication information $K_O$ to said terminal and means for comparing authentication information $K_i$ generated by the module with authentication information $K'_i$ received from said terminal; and
    said system further including means for inhibiting said information transmission in response to said comparison and in response to the state of said receipt signals.

2. A system according to claim 1, wherein said terminal generates said authentication value $K'_i$ only if said receipt signal is in its state corresponding to the fact that payment has been performed.

3. A system according to claim 1, in which said terminal is a telephone set.

4. A system according to claim 3, further including a telephone exchange connected to said transmission line, with said charging signals being emitted by said exchange.

5. A system according to claim 1, in which said charging signals also constitute said synchronizing signals.

6. A system according to claim 1, in which said payment verification means include means for reading information concerning an amount available in the memory of a removeable information medium and for modifying said amount, where possible, in response to said charging signal.

7. A system according to claim 3, wherein said telephone set is mounted on said transmission line.

8. A system according to claim 1, wherein each authentication information comprises a succession of binary values, with a first binary state consisting in the absence of a signal and the other binary state consisting in the presence of a frequency signal.

9. A system according to claim 1, in which each authentication information is constituted by a succession of frequency signals with the frequencies thereof being selected from a plurality n of pre-established frequencies.

* * * * *